Patented Jan. 22, 1952

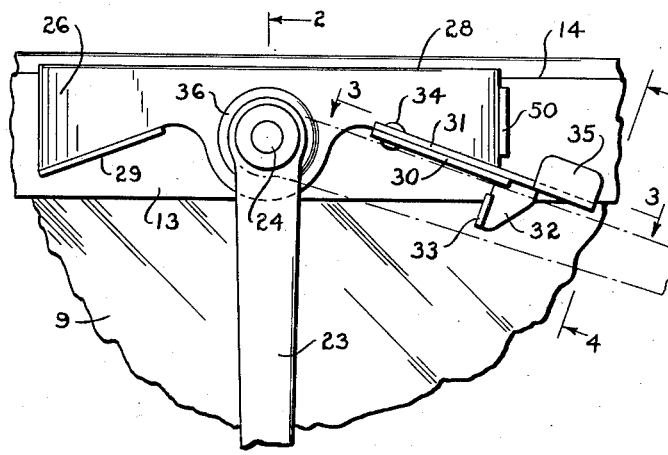

2,583,126

UNITED STATES PATENT OFFICE 2,583,126

WINDSHIELD WIPER APPARATUS

Theodore J. Smulski, Gary, Ind., assignor to Productive Inventions, Inc., a corporation of Indiana Continuation of application Serial No. 475,482, February 11, 1943. This application November 19, 1945, Serial No. 629,653

14 Claims. (Cl. 15—255)

My invention relates to windshield wipers and more particularly to an apparatus for hand-operated windshield wipers.

This application is a continuation of my application Serial No. 475,482, filed February 11, 1943, now abandoned.

Many military vehicles, particularly reconnaissance cars including armored cars and the lighter cars more popularly known as jeeps and peeps, have been equipped with hand-operated windshield wipers. In the operation of such wipers it has been found, particularly where the terrain is rough, that frequently the operating handle or crank is moved so far as to cause the wiper arm and the blade attached thereto to be moved off the glass onto the windshield frame. The edge of the windshield frame adjacent the windshield glass forms a relatively sharp step, with which the wiping element of the wiper blade comes in engagement whenever the blade is moved off the windshield glass. This windshield frame stop has such a shearing effect on the wiping element that soon it is torn or loosened from the frame thus rapidly destroying the wiper blade. When the wiper is parked so that the blade rests on the windshield frame, the wiping element is distorted so that a permanent deformation of the wiping edge results thus rendering the blade practically useless.

Due to the fact that such vehicles travel over rough terrain, the windshield wiper is subjected to a great amount of vibration so that the windshield wiper arm and blade will not remain in a set position in the vicinity of the windshield frame, but will slip down and casually swing or vibrate from side to side in the central portion of that area of the windshield through which the vehicle operator must look, thus interfering with the operator's vision. This vibration and movement of the wiper arm and blade causes unnecessary wear of the windshield wiper thereby impairing the efficiency and shortening the life of the wiper.

It is desirable, therefore, to provide some arrangement whereby the windshield wiper is prevented from being moved beyond the area of the windshield glass, and also to provide some arrangement for keeping the wiper blade and arm out of the normal vision area of the windshield during periods of non-use. Furthermore it is desirable to provide such an arrangement which can be installed without modification or redesign of the wiper already in use, and without the use of any special skill or tools.

It is an object of my invention to provide for hand-operated windshield wipers an apparatus for limiting the range of movement of the wiper blade on the surface of the windshield.

A further object of my invention is to provide an apparatus for hand-operated windshield wipers which may be readily adapted to present wiper installations for limiting the movement of the wiper and for locking the wiper in a parked position during periods of non-use of said wiper.

Hand-operated windshield wipers are generally mounted with the shaft passing through the upper frame of the windshield, or with the shaft directly above the windshield frame, a wiper arm being connected on the shaft in front of the windshield and a crank handle being mounted on the shaft behind the windshield. In accordance with my invention an apparatus is provided for limiting the movement of the windshield wiper, and for retaining the wiper in a predetermined position during periods of non-use, this apparatus being desirably made to surround the operating shaft, and being desirably located between the windshield frame and the operating handle or crank for the windshield wiper.

Other and further objects of my invention subsequently will become apparent herein.

In the accompanying drawing which is a part of this specification:

Figure 1 is a fragmentary view of the inside of a windshield provided with a hand-operated windshield wiper and with associated apparatus embodying one illustrative form of my invention;

Figure 2 is a sectional view taken along the line 2—2 of Figure 1 looking in the direction of the arrows;

Figure 3 is a fragmentary sectional view taken along the line 3—3 of Figure 1, looking in the direction indicated by the arrows;

Figure 4 is a fragmentary sectional view showing the locking latch portion of the apparatus of Figure 1, the section being taken upon the line 4—4 of Figure 1, looking in the direction indicated by the arrows;

Figure 5 is a view in rear elevation of another illustrative embodiment of my invention; and Figure 6 is a fragmentary cross-sectional view of the embodiment shown in Figure 5, the view showing also the relation of the apparatus of Figure 5 to the windshield frame and the adjacent portions of the windshield wiper mechanism.

A portion of a windshield glass 9 supported in a windshield frame 10 is shown in the fragmentary views of Figures 1 and 2. While the windshield frame may be of any desired structure, a particular frame 10 of conventional structure has been shown for conveniently illustrating how the present invention may be applied to a hand-operated windshield wiper installed on a windshield frame. The frame 10, as is usual, comprises a rear metallic frame member 11 which is L-shaped in cross section and a forward metallic frame member or bezel 12 which is flat. Also in accordance with usual practice, the frame 10 has an inside generally vertical plane surface 13, and generally horizontal plane surfaces such as 14 and 15. In the particular windshield frame structure shown the glass 9 is surrounded by a resilient or soft material 16 which, in turn, is mounted within an inner channel member 17 of the frame.

Hand-operated windshield wipers are mounted on windshield frames either by mounting the operating shaft directly above the windshield frame in a suitable frame extension attached to the frame, or by mounting the operating shaft through an aperture in the windshield frame, itself.

The latter construction is illustrated in the drawing, wherein it will be seen that a windshield wiper shaft 18 is mounted to extend through suitable apertures formed in the windshield frame members 11 and 12, so as to project to the rear and to the front of the frame. Immediately adjacent the front of the windshield frame 10, the shaft 18 has mounted upon it a suitable thrust bearing collar 19, and just forwardly of the collar 19 there is affixed upon the shaft a wiper arm collar 20 to which the inner section 21 of a windshield wiper arm 22 is attached. The rear end of the wiper shaft 18 desirably has rigidly attached to it an operating handle or wiper crank 23. The operating handle 23 may be affixed to the wiper shaft 18 in any suitable manner, as by impaling the inner end of the arm, between members, upon the rear or inner end of the shaft and upsetting or riveting the end of the shaft as shown at 24.

The crank 23 is desirably a channeled member whose channel faces forwardly, toward the windshield. The shaft 18, the crank 23, the collar 19 and the collar 20 constitute a wiper mounting assembly. The shaft is adapted to be passed through a structure, and the crank and collar are adapted to confine the structure between them.

It will be noted that the collar 20, as well as the collar 19, constitutes a thrust member mounted on the shaft, and forms a part of the wiper mounting assembly. The collar 19, when employed, serves to transmit the thrust of the windshield frame to the collar 20; otherwise the collar 20 or the wiper arm itself serves as the thrust member, to engage the frame directly for limiting relative movement of the shaft and frame.

Apparatus embodying the present invention is mounted between the operating handle or crank 23 and the inner surface 13 of the windshield frame 10. This apparatus comprises an L-shaped sheet metal bracket 25 having a vertically disposed body portion 26 which is formed substantially midway between its ends with means for receiving the wiper shaft 18, such as the aperture 27. The body portion 26 has extended surface engagement with the generally vertical inside or rear surface 13 of the windshield frame at opposite sides of the shaft 18. The bracket 25 also includes a forwardly extending portion 28 which is adapted to have extensive engagement with the generally horizontal surface 14 of the windshield frame 10 at opposite sides of the shaft 18 to prevent substantial rotation of the bracket. At the opposite sides of the shaft 18, the body portion 26 of the bracket 25 is provided with rearwardly projecting stop wings 29 and 30. The wing 29 is inclined downwardly and outwardly, such that the wing is adapted to be engaged substantially simultaneously throughout its length by the adjacent face of the crank 23 for arresting the crank. While each of the wings 29 and 30 may be similarly formed to engage throughout its length the crank 23, the wing 30, desirably for ease in manufacture, is formed so that the rivet 34 and the outer end of the wing 30 engage the crank 24 when arresting the movement of the crank. The wings determine opposite limits of movement of the crank 23, limiting the range of movement of the crank 23 and the wiper shaft 18 to an obtuse angle.

By limiting the movement of the wiper crank 23 to an obtuse angle, the wiper arm and blade are caused to be limited to move through a corresponding obtuse angle, and the blade is compelled to remain within the boundaries of the windshield glass 11 at all times. Thus, the blade and arm cannot be damaged, as heretofore, by improper operation of the wiper.

A latch or spring retaining means may also be provided for parking and retaining the wiper in a certain position when not in use. While any one of several such means may be employed, I have shown one of the rearwardly extending stop wings, such as provided with a pivotally mounted latch member 31. The latch member 31 is provided with a depending portion 32 which terminates in a rearwardly extending hook portion 33 adapted to engage beneath a portion at least of handle 23, and desirably within the channel portion of the handle 23 as may be readily understood from Figures 3 and 4. The pivotally mounted latch member 31 may be frictionally attached to the member 30 by any suitable means such as a rivet 34. The other extremity of the member 31 is provided with a finger piece portion 35 which extends upwardly. The finger piece 35 may be readily grasped by the fingers. The latch member is detained by friction in its operative and inoperative positions, but the friction applied is of a sufficiently low order to offer no objectionable opposition to the operation of the latch from one to the other of said positions.

When the latch 31 is pushed forwardly against the base portion of the bracket 25, the hook portion 33 is out of the path of movement of the crank 23. When the latch member 31 is moved rearwardly by pulling on the finger portion 35, the hook 33 is moved into the channel of the crank 23, and is thereby caused to engage the crank so as to retain it in the dotted line position shown in Figure 1. When the crank 23 is thus locked in parked position by the latch, the wiper arm 22 and blade 8 are held out of the central area of vision and the wiper is not subjected to unnecessary wear due to vibration.

The portion 26 of the bracket, as illustrated in Figure 1 of the drawing, is preferably provided with an outstanding lug or projection 50 opposite the wing or lug 30 for the purpose of providing an abutment to limit undue upward movement of the latch. In other words, the latch is guided for movement between spaced abutments, the lug 50 preventing accidental distortion or bending of the latch.

It will be noted that the member 25 adjacent the wiper shaft aperture 27 is provided with a formed bearing portion 36 which bears against the crank 23 or against a washer position on the shaft 18.

No extraneous fastening means are necessary since the forwardly extending portion 28 of the bracket 25 engages the surface 14 of the windshield frame at opposite sides of the shaft 18 and, in cooperation with the wiper mounting assembly itself, prevents any angular movement of the bracket, causing the positions of the stop portions 29 and 30 to be fixed.

To install the present stop and latch apparatus, upon existing structures, it is only necessary to remove the wiper arm section 21 and the collars 20 and 19 and then to withdraw the shaft 18 from the windshield frame 12. Thereupon the bracket 25 may be slipped over the shaft and the windshield wiper parts may be reassembled with one another and with the frame. The wiper mounting assembly serves to hold the bracket 25 to the frame in proper relation to the latter. No special skill or tool is required to make the installation, nor is the windshield or wiper altered in any way.

Figures 5 and 6 show another form of apparatus embodying my invention and performing the functions of the apparatus shown in Figures 1 to 4, inclusive. All of the parts illustrated in Figures 5 and 6 are the same as parts already illustrated in Figures 1 to 4, and described in connection with those figures, save that the bracket 25 of Figures 1 to 4 is replaced by a different form of bracket in Figures 5 and 6. Corresponding reference characters have accordingly been applied in Figures 5 and 6 to parts which are merely carried over without change from Figures 1 to 4, and no further detailed description of these parts will be given.

In the apparatus of Figures 5 and 6 the angle bracket 40 has a body portion 37 which is provided with a centrally located bearing portion 38 surrounding a suitable shaft receiving means or aperture 39. At the lower edge of the body portion 37 there is a forwardly turned flange 41 which terminates in an upwardly turned flange 42. The flange 42 extends upwardly but a short distance so as to push aside a small amount of the resilient material 16 that surrounds the windshield glass 11. Thus, the lower edge of the body portion 37 is provided with a forwardly extending channeled portion which embraces a generally horizontal portion 15 of the windshield frame 10. Along the upper boundaries of the body portion 37 rearwardly extending angularly related stop wings 43 and 44 are provided which correspond in location, disposition, structure and formation to the stop wings 29 and 30 of the apparatus shown in Figure 1. The upwardly extending flange 42 of the bracket 40 overcomes any tendency of the bracket 40 to be shifted to disengage the flange 41 from the horizontal surface 15 of the windshield frame when the wiper crank 24 engages either of the stop portions 43 and 44. One of these stop portions such as 44, is provided with a latch 45 pivotally mounted thereon by suitable fastening means such as a rivet 46. The construction and mounting of the latch 45 are desirably identical with the construction and mounting of the latch 31, the latch 45 being provided with an upstanding finger portion 48 and with a depending hook portion 47 so that the latch 45 may be moved back and forth in and out of engagement with an operating crank or arm such as 24.

While the present invention has been shown in connection with a hand-operated windshield wiper which is carried directly by a windshield frame, the principle of the invention is also applicable to a hand-operated windshield wiper carried upon the frame through an attachment applied to the front to form a wiper mounting extension thereof, as will be readily apparent to those skilled in the art.

I have described what I believe to be the best embodiments of my invention. I do not wish, however, to be confined to the embodiments shown, but what I desire to cover by Letters Patent is set forth in the appended claims.

I claim:

1. In a hand-operated windshield wiper adapted to be mounted on a windshield which includes a frame having a face portion and adjacent external surface portions offset therefrom, in combination, a wiper mounting assembly including a shaft adapted to extend through the windshield frame and to protrude at the front and rear thereof, a wiper arm member mounted on the protruding forward end of said shaft, and an operating crank member mounted on the protruding rearward end of said shaft, a wiper blade carried by the arm, and an apparatus located between said windshield frame and one of the members mounted on the shaft, said apparatus having a base portion formed so that it may receive and directly engage such shaft and confined between the windshield frame and the member last referred to by the wiper mounting assembly; an additional portion extending in offset relation to said base portion and constructed and arranged to engage an external offset surface portion of said windshield frame in opposition to engagement of the shaft by the base to prevent substantial rocking of said apparatus about the axis of said shaft, and a stop portion extending in offset relation to said base portion and adapted to limit swinging movement of said wiper about the shaft axis.

2. In a hand-operated windshield wiper adapted to be mounted on a windshield which includes a frame having a face portion and adjacent external surface portions offset therefrom, in combination, a wiper mounting assembly including a shaft adapted to extend through the windshield frame and to protrude at the front and rear thereof, a wiper arm member mounted on the protruding forward end of said shaft, and an operating crank member mounted on the protruding rearward end of said shaft, a wiper blade carried by the arm, and an apparatus located between said windshield frame and one of the members mounted on the shaft, said apparatus having a base portion formed so that it may receive and directly engage such shaft and confined between the windshield frame and the member last referred to by the wiper mounting assembly, an additional portion extending in offset relation to said base portion and constructed and arranged to engage an external offset surface portion of said windshield frame in opposition to engagement of the shaft by the base to restrict rocking of said apparatus about the axis of said shaft, stop portions each extending from said base portion in offset relation thereto and adapted to limit the swinging movement of said wiper about the axis of the shaft, and a latch member pivotally mounted on one of said stop members for fore and aft adjustment, adapted to be set in an inoperative position clear of the wiper crank path or to be set in the operating path of said wiper crank to engage a portion of the crank and thereby to retain the wiper in a predetermined position during periods of non-use of such wiper.

3. In a hand-operated windshield wiper adapted to be mounted on a windshield which includes a frame having a face portion and adjacent external surface portions offset therefrom, in combination, a wiper mounting assembly which comprises a shaft adapted to extend through the windshield frame and to protrude at the front and rear thereof, a wiper arm member mounted on the forward end of such shaft, and an operating handle member mounted on the rearward end of said shaft, a wiper blade carried by the arm, and an apparatus located between said windshield frame and one of the members mounted on the shaft, said apparatus having a base portion formed to receive and directly engage said shaft and confined between the windshield frame and the member last referred to by the wiper mounting assembly, an additional portion extending in offset relation to said base portion and constructed and arranged to engage an external offset surface portion of said windshield frame in opposition to engagement of the shaft by the base to restrict rocking of said apparatus about the axis of said shaft, a stop portion extending in offset relation to said base portion for limiting the swinging movement of said wiper about the axis of the shaft, thereby to prevent the wiper blade from leaving the area within the windshield frame, and detaining means comprising a part of the assembly for holding said wiper in a predetermined position during periods of non-use of said wiper.

4. In a hand-operated windshield wiper adapted to be mounted on a windshield frame, in combination, a wiper mounting assembly comprising a shaft adapted to extend through the windshield frame and to protrude at the front and rear thereof, a member mounted on the front end of said shaft, to restrict rearward movement of the shaft, and an operating crank handle mounted on the rear end of such shaft, and a member mounted and held between the said crank handle and said windshield frame by the wiper mounting assembly, said latter member having a base portion adapted to receive and directly engage a wiper shaft at an intermediate point thereon, said base portion being adapted to engage a rear surface of said windshield frame, forwardly extending portions constructed and arranged to engage, in opposition to engagement of the shaft by the bases external surface portions of said windshield frame which extend transversely of the plane of the windshield, and a rearwardly extending stop portion adjacent the opposite edge of said base, said stop portion being positioned so as to engage said crank and limit the swinging movement thereof in one direction about the axis of the shaft.

5. In a hand-operated windshield wiper adapted to be mounted on a channeled windshield frame which supports therein a windshield glass, in combination, a wiper mounting assembly including a shaft adapted to extend through the frame and to protrude at the front and rear thereof, a wiper arm member mounted on the front end of said shaft and an operating crank member mounted on the rear end of said shaft, and an apparatus adapted to be mounted between said frame and one of the members mounted on the shaft comprising a base portion adapted to engage a face of the windshield frame at widely spaced points, said base portion formed to receive and directly engage the shaft and being held between the windshield frame and the member last referred to by the wiper mounting assembly, an additional portion extending in offset relation to said base portion and terminating in an outturned portion constructed and aranged to engage a channel wall of the windshield frame in opposition to engagement of the shaft by the base and to embrace said wall for preventing substantial rocking of said apparatus about the axis of the shaft, and a stop portion extending from said base portion in offset relation thereto and adapted to limit the swinging movement of said wiper in one direction about the axis of the shaft.

6. A stop and detaining apparatus for a windshield wiper which includes a wiper mounting assembly comprising a shaft adapted to extend through a windshield frame and to protrude at the front and rear thereof, a wiper arm member mounted on the forward end of such shaft, a member adapted to be operated mounted on the rearward end of said shaft, and a wiper blade carried by the arm, said apparatus having a base portion formed so that it may receive and directly engage said shaft and adapted to be held between the windshield frame and one of the members on the shaft, an additional portion extending in offset relation to said base portion and constructed and arranged to engage an external offset surface portion of the windshield frame in opposition to engagement of the shaft by said base to prevent substantial rocking of said apparatus about the axis of said shaft, stop portions extending in offset relation to said base portion for limiting the swinging movement of said wiper about the axis of the shaft, thereby to prevent the wiper blade from leaving the area within the windshield frame, and detaining means for holding said wiper in a predetermined position during periods of non-use of the wiper.

7. A stop apparatus for a windshield wiper which includes a wiper mounting assembly comprising a shaft adapted to extend through a windshield frame and to protrude at the front and rear thereof, a wiper arm member mounted on the forward end of such shaft, a member adapted to be operated mounted on the rearward end of said shaft, and a wiper blade carried by the arm; said apparatus adapted to be located between the frame and one of the members mounted on the shaft and having a base portion formed so that it may receive and directly engage such shaft and be confined between the windshield frame and the member last referred to by the wiper mounting assembly, an additional portion extending in offset relation to said base portion and constructed and arranged to engage an external offset surface portion of said windshield frame in opposition to engagement of the shaft by said base to prevent substantial rocking of said apparatus about the axis of the shaft, and a stop portion extending in offset relation to said base portion and adapted to limit the swinging movement of said wiper in one direction about the axis of the shaft.

8. A unitary article of manufacture for holding a pivotal windshield wiper means, said article consisting of, a member adapted to be mounted with respect to the frame of a windshield, stop means provided on said member for limiting movement of the wiper means in one direction, independently operable latch means carried by said stop means, and means also on said member which may be engaged by the latch means whereby to prevent damage to said latch means when it is excessively moved in a direction substantially transverse to its regular plane of movement.

9. A unitary article of manufacture for holding a movable element of a windshield wiper, said article consisting of a member having a generally planar portion adapted to engage one surface of a support and an angle portion extending in one direction from the planar portion adapted to engage another surface of such support, means extending from the planar portion in a direction opposite to that of said angle portion, a latch operatively connected to said extending means for movement in a plane generally transverse to said planar portion, and means also on said member provided adjacent said extending means whereby to assist in preventing distortion of said latch when it is moved out of its plane in one direction.

10. A unitary article of manufacture for holding a windshield wiper device having a movable element, said article consisting of a member having a substantially planar portion provided with an aperture adapted to receive a pivotal drive shaft for the device in a manner whereby the shaft provides means for attaching the member to a mounting, immovable means carried by and projecting from the member, independently operable latch means carried by a part of the immovable means for movement in a plane substantially perpendicular to said planar portion, said immovable means being constructed to receive the latch means, and said latch means having a hook portion for engaging the movable element to lock it in a predetermined position with respect to said planar portion and a finger portion for manipulating the latch means.

11. A unitary article of manufacture for holding a crank of a windshield wiper device, said article consisting of an elongated bracket adapted for attachment to a mounting, the extremities of said bracket being provided with outwardly extending stops for limiting rotation of the crank in opposite directions, and a latch mounted on one of the bracket extremities for holding the crank relative to one of the stops.

12. A unitary article of manufacture consisting of an elongated bracket adapted to be mounted adjacent to the frame of a windshield, said bracket being provided with an aperture through which a drive shaft may be extended to pivotally support a wiper arm and crank, a first stop on one extremity of the bracket for limiting movement of the crank in one direction, a latch pivoted on the stop for engaging and holding the crank relative to the stop, and a second stop on the other extremity of the bracket for limiting movement of the crank in an opposite direction.

13. A unitary article of manufacture for holding a crank of a windshield wiper device, said article consisting of an elongated bracket adapted for attachment to a mounting, the extremities of said bracket being provided with outwardly extending stops for limiting rotation of the crank, a latch pivotally mounted on one of the stops for movement in a single plane for holding the crank relative to said stop, and a lug carried by said bracket located in spaced apart relationship to said one stop providing an abutment which may be engaged by the latch to prevent distortion of the latch when the latter is accidentally moved out of its regular plane of movement.

14. A unitary article of manufacture for holding an arm of a windshield wiper device, said article consisting of an elongated bracket adapted for attachment to a mounting, the extremities of said bracket being provided with outwardly extending stops for limiting rotation of the arm, a latch pivotally mounted on one of the stops for movement in a single plane for holding the arm relative to said stop, and a lug carried by said bracket located in spaced apart relationship to said one stop providing an abutment which may be engaged by the latch to prevent distortion of the latch when the latter is accidentally moved out of its regular plane of movement.

THEODORE J. SMULSKI.

REFERENCES CITED

The following references are of record in the file of this patent:

UNITED STATES PATENTS

| Number | Name | Date |
| --- | --- | --- |
| 186,715 | Deal | Jan. 30, 1877 |
| 353,025 | Grant | Nov. 23, 1886 |
| 388,149 | Powell | Aug. 21, 1888 |
| 669,034 | Manly | Feb. 26, 1901 |
| 1,065,525 | Henkel | June 24, 1913 |
| 1,110,368 | Young | Sept. 15, 1914 |
| 1,165,704 | Ousley | Dec. 28, 1915 |
| 1,355,728 | Bennett | Oct. 12, 1920 |
| 1,639,778 | Locke | Aug. 23, 1927 |
| 1,687,412 | White | Oct. 9, 1928 |